(12) United States Patent
Forutanpour et al.

(10) Patent No.: US 9,237,601 B2
(45) Date of Patent: Jan. 12, 2016

(54) MOBILE DEVICE FUNCTION SELECTION USING POSITION IN RELATION TO A USER

(75) Inventors: Babak Forutanpour, San Diego, CA (US); Shivakumar Balasubramanyam, San Diego, CA (US); Bennett M. King, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 19 days.

(21) Appl. No.: 13/475,689

(22) Filed: May 18, 2012

(65) Prior Publication Data

US 2013/0310110 A1   Nov. 21, 2013

(51) Int. Cl.
| | | |
|---|---|---|
| H04M 3/00 | (2006.01) |
| H04W 88/02 | (2009.01) |
| G06F 1/16 | (2006.01) |
| G06F 3/01 | (2006.01) |
| H04M 1/725 | (2006.01) |
| H04M 1/03 | (2006.01) |

(52) U.S. Cl.
CPC ............ *H04W 88/02* (2013.01); *G06F 1/1626* (2013.01); *G06F 1/1694* (2013.01); *G06F 3/017* (2013.01); *H04M 1/72569* (2013.01); *G06F 2200/1637* (2013.01); *H04M 1/03* (2013.01)

(58) Field of Classification Search
CPC . H04M 1/03; H04M 1/2474; H04M 2250/12; H04W 88/02
USPC ............... 455/41.2, 41.3, 414.1, 418–420
See application file for complete search history.

(56) References Cited

U.S. PATENT DOCUMENTS

| | | |
|---|---|---|
| 8,004,493 B2 | 8/2011 | Herz et al. |
| 8,170,621 B1 | 5/2012 | Lockwood |
| 2002/0021278 A1 | 2/2002 | Hinckley et al. |
| 2007/0036348 A1 | 2/2007 | Orr |
| 2008/0014989 A1* | 1/2008 | Sandegard et al. ........... 455/557 |
| 2008/0207264 A1* | 8/2008 | Harmke ..................... 455/557 |
| 2009/0005072 A1 | 1/2009 | Forstall et al. |
| 2009/0060170 A1* | 3/2009 | Coughlan et al. ........ 379/433.02 |
| 2009/0215398 A1* | 8/2009 | Adler et al. .................. 455/41.3 |
| 2010/0048256 A1* | 2/2010 | Huppi et al. ................. 455/574 |
| 2010/0079405 A1 | 4/2010 | Bernstein |
| 2010/0255832 A1 | 10/2010 | Prather et al. |
| 2010/0295781 A1 | 11/2010 | Alameh et al. |
| 2012/0100889 A1 | 4/2012 | Kim et al. |
| 2012/0244911 A1* | 9/2012 | Endo et al. .................... 455/566 |

OTHER PUBLICATIONS

International Search Report and Written Opinion—PCT/US2013/036648—ISA/EPO—Jul. 1, 2013.

* cited by examiner

*Primary Examiner* — Charles Appiah
*Assistant Examiner* — Jaime Holliday
(74) *Attorney, Agent, or Firm* — Kilpatrick Townsend & Stockton LLP

(57) ABSTRACT

Various arrangements for selecting a function to be executed on a mobile device are presented. A processor may receive proximity data that indicates the mobile device is proximate to a user. The processor may receive acceleration data that indicates a direction of acceleration. In response to receiving the proximity data indicating that the mobile device is proximate to the user, the processor may identify a position of the mobile device in relation to the user using the acceleration data. In response to identifying the position of the mobile device in relation to the user using the acceleration data, the processor may select a function to be executed.

19 Claims, 7 Drawing Sheets

MOBILE DEVICE FUNCTION SELECTION USING POSITION IN RELATION TO A USER

BACKGROUND

Mobile devices, such as smartphones, have become ubiquitous in many people's lives. Such mobile devices are being used to store, access, and/or interact with vast quantities of locally and remotely stored information. To store, access, and/or interact with such information, a user of a mobile device makes use of various functions (e.g., applications) of the mobile device. For example, in order to set a reminder, the user may use a voice memo application installed on the mobile device in order to record an audio memo to be played back at a later time, and in order to place a call, the user may use a different function of the mobile device. Typically, in order to select a function for use, the user may need to perform a sequence, such as: activate a display of the mobile device, select the appropriate function using the display, and then interact with the function.

At least some users may desire an alternative or additional way to activating a function of a mobile device that is desired to be used.

SUMMARY

In some embodiments, a method for selecting a function to be executed on a mobile device is presented. The method may include collecting, by the mobile device, proximity data that indicates the mobile device is proximate to a user. The method may include collecting, by the mobile device, acceleration data. The method may include determining, by the mobile device, a position of the mobile device in relation to the user using the acceleration data. In response to determining the position of the mobile device in relation to the user using the acceleration data, the method may include selecting, by the mobile device the function to be executed.

Embodiments of such a method may include one or more of the following: Determining, by the mobile device, the position of the mobile device in relation to the user using the acceleration data may comprise determining, by the mobile device, which ear of the user is proximate to the mobile device using the acceleration data. Determining which ear of the user is proximate to the mobile device using the acceleration data may comprise determining a direction of acceleration along an axis of the mobile device, wherein the direction of acceleration along the axis varies based on which ear of the user is proximate to the mobile device. A proximity sensor of the mobile device may be positioned on the mobile device to be proximate to an ear of the user when the mobile device is positioned for listening to a speaker of the mobile device by the user. A display of the mobile device may be deactivated while each step of the method is being performed. The proximity data may indicate that a speaker of the mobile device is proximate to the user and the mobile device is being gripped. Determining, by the mobile device, the position of the mobile device in relation to the user using the acceleration data may comprise identifying the position of the mobile device using the acceleration data as held in front of the user's mouth. The method may include executing, by the mobile device, the function. The method may include receiving, by the mobile device, a first indication of a first function to perform by the mobile device when held to a left ear. The method may include receiving, by the mobile device, a second indication of a second function to perform by the mobile device when held to a right ear.

In some embodiments, a device configured to select a function to be executed may be presented. The device may include a proximity sensor configured to collect proximity data. The device may include an accelerometer configured to collect acceleration data. The device may include a processor. The device may include a memory communicatively coupled with and readable by the processor and having stored therein processor-readable instructions. When executed by the processor, the processor-readable instructions may cause the processor to analyze the proximity data from the plurality of proximity sensors wherein the proximity data indicates the mobile device is proximate to a user. When executed by the processor, the processor-readable instructions may cause the processor to analyze acceleration data from the accelerometer. When executed by the processor, the processor-readable instructions may also cause the processor to determine, using the acceleration data, a position of the mobile device in relation to the user. When executed by the processor, the processor-readable instructions may also cause the processor to, in response to determining the position of the mobile device in relation to the user using the acceleration data, select the function to be executed.

Embodiments of such a device may include one or more of the following: The processor-readable instructions which, when executed by the processor, cause the processor to determine the position of the mobile device in relation to the user using the acceleration data may further comprise processor-readable instructions to determine, using the acceleration data, which ear of the user is proximate to the mobile device. The processor-readable instructions which, when executed by the processor, cause the processor to determine, using the acceleration data, which ear of the user is proximate to the mobile device may further comprise processor-readable instructions to determine a direction of acceleration along an axis of the mobile device, wherein the direction of acceleration along the axis varies based on which ear of the user is proximate to the mobile device. The proximity sensor of the mobile device may be positioned on the mobile device to be proximate to an ear of the user when the mobile device is positioned for listening to a speaker of the mobile device by the user. A display of the mobile device may be deactivated while each step of the method is being performed. The proximity data may indicate that a speaker of the mobile device is proximate to the user and the mobile device is being gripped. Determining, by the mobile device, the position of the mobile device in relation to the user using the acceleration data may comprise identifying the position of the mobile device using the acceleration data as held in front of the user's mouth. The processor-readable instructions may further comprise processor-readable instructions, which when executed by the processor, cause the processor to execute the function. The processor-readable instructions further comprise processor-readable instructions configured to cause the processor to receive a first indication of a first function to perform by the mobile device when held to a left ear, and receive a second indication of a second function to perform by the mobile device when held to a right ear.

In some embodiments, a computer program product for selecting a function to be executed on a mobile device is presented. The computer program product may comprise processor-readable instructions, which, when executed by the mobile device, cause the mobile device to collect proximity data that indicates the mobile device is proximate to a user. The processor-readable instructions may be further configured to cause the processor to collect acceleration data. The processor-readable instructions may be further configured to cause the processor to determine a position of the mobile device in relation to the user using the acceleration data. The processor-readable instructions may be further configured to cause the processor to, in response to determining the position of the mobile device in relation to the user using the acceleration data, select the function to be executed.

Embodiments of such as computer program product may include one or more of the following: The processor-readable instructions which, when executed by the mobile device, cause the mobile device to determine the position of the mobile device in relation to the user using the acceleration data may further comprise processor-readable instructions which, when executed by the mobile device, cause the mobile device to determine which ear of the user is proximate to the mobile device using the acceleration data. The processor-readable instructions which, when executed by the mobile device, cause the mobile device to determine which ear of the user is proximate to the mobile device using the acceleration data may further comprise processor-readable instructions which, when executed by the mobile device, cause the mobile device to determine a direction of acceleration along an axis of the mobile device, wherein the direction of acceleration along the axis varies based on which ear of the user is proximate to the mobile device. A display of the mobile device may be off while each of the processor-readable instructions is executed. The proximity data may indicate that a speaker of the mobile device is proximate to the user and the mobile device is being gripped. The processor-readable instructions which, when executed by the mobile device, cause the mobile device to determine the position of the mobile device in relation to the user using the acceleration data may further comprise processor-readable instructions which, when executed by the mobile device, cause the mobile device to identify the position of the mobile device using the acceleration data as held in front of the user's mouth. The processor-readable instructions may further comprise processor-readable instructions configured to cause the mobile device to execute the function. The processor-readable instructions may further comprise processor-readable instructions configured to cause the mobile device to receive a first indication of a first function to perform by the mobile device when held to a left ear; and receive a second indication of a second function to perform by the mobile device when held to a right ear.

In some embodiments, an apparatus for selecting a function to be executed on a mobile device may be presented. The apparatus may include means for collecting proximity data that indicates the mobile device is proximate to a user. The apparatus may include means for collecting acceleration data. The apparatus may include means for determining a position of the mobile device in relation to the user using the acceleration data. The apparatus may include means for selecting the function to be executed at least partially in response to the means for determining the position of the mobile device in relation to the user using the acceleration data.

Embodiments of such an apparatus may include one or more of the following: The means for determining the position of the mobile device in relation to the user using the acceleration data may comprise means for determining which ear of the user is proximate to the mobile device using the acceleration data. The means for determining which ear of the user is proximate to the mobile device using the acceleration data may comprise means for determining a direction of acceleration along an axis of the mobile device, wherein the direction of acceleration along the axis varies based on which ear of the user is proximate to the mobile device. The means for collecting proximity data may be positioned on the mobile device to be proximate to an ear of the user when the mobile device is positioned for listening to a speaker of the mobile device by the user. The means for display of the mobile device may be deactivated while each step of the apparatus is being performed. The proximity data may indicate that a speaker of the mobile device is proximate to the user and the mobile device is being gripped. The means for determining the position of the mobile device in relation to the user using the acceleration data may comprise means for identifying the position of the mobile device using the acceleration data as held in front of the user's mouth. The apparatus may include means for executing the function. The apparatus may include means for receiving a first indication of a first function to perform by the mobile device when held to a left ear. The apparatus may include means for receiving a second indication of a second function to perform by the mobile device when held to a right ear. The apparatus may include means for storing the first indication and the second indication.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
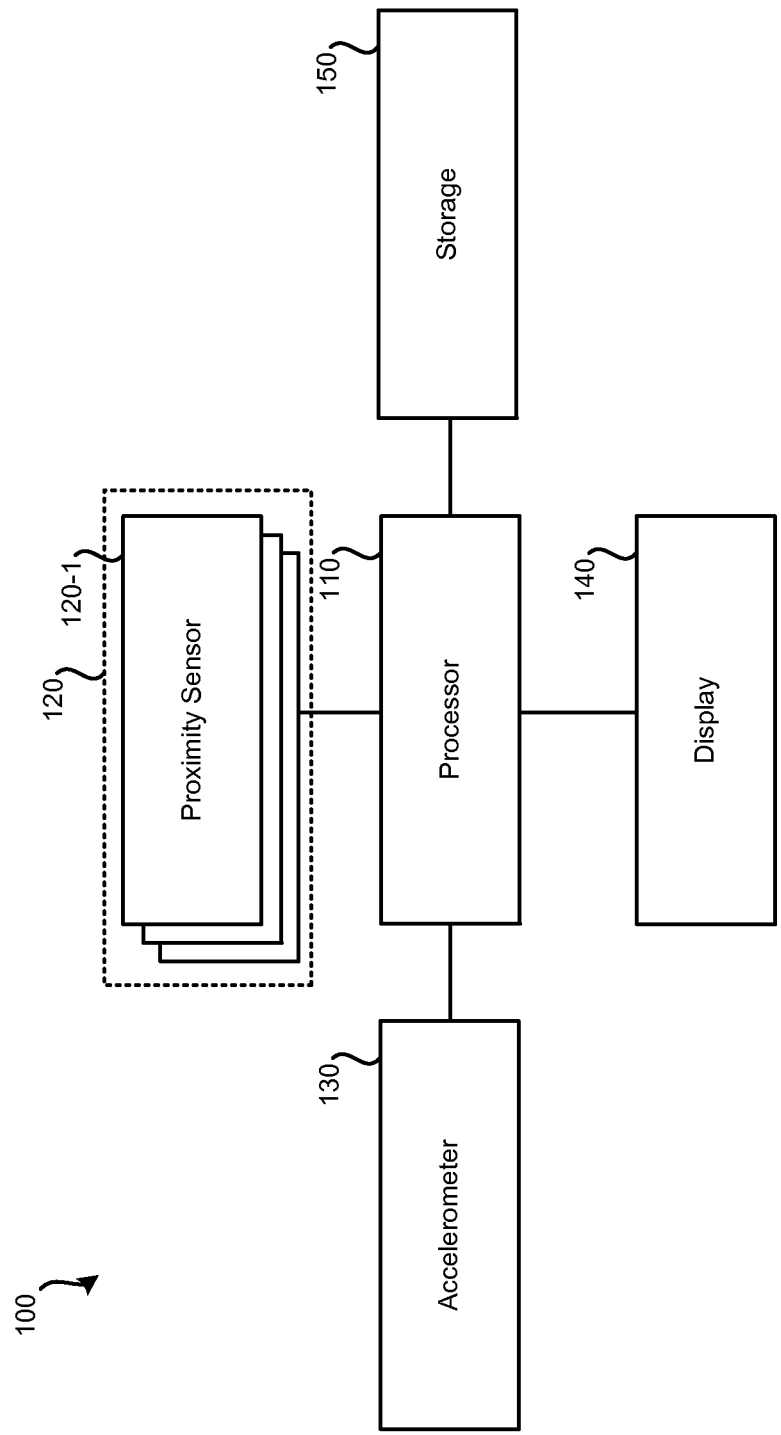
FIG. 1 illustrates an embodiment of a system configured to select a function to be executed by a mobile device.

Proximity data in conjunction with acceleration data may be used to determine where a mobile device is located in relation to a user. For example, data from one or more proximity sensors may indicate that a mobile device is (likely) being held at or near one of the user's ears. Using data from an accelerometer of the mobile device, which ear the mobile device is being held to may be identified. Typically, a mobile device held to a user's ear is held at an angle such that a speaker is proximate to the user's ear and a microphone is proximate to the user's mouth. As such, the direction of gravity as measured by the accelerometer can be used to determine which ear the mobile device is likely being held to.

Depending on which ear the mobile device is held to, a different function of the mobile device may be executed. Accordingly, a user may be able to execute a desired function by holding the mobile device to the appropriate ear. Additionally, in some embodiments, other functions may be selected by holding the mobile device in another location in relation to the user, such as in front of the user's mouth.

Proximity sensing can be used to detect when a triggering entity, such as a portion of a human body (e.g., finger, leg, ear, chest) is either 1) in contact with a proximity sensor or 2) near the proximity sensor. One type of proximity sensor is a capacitive proximity sensor that detects changes in capacitance caused by a triggering entity. Such a capacitive proximity sensor may include one or two electrodes. A dual-electrode capacitive proximity sensor may detect the presence of a portion of a human body by measuring changes in capacitance between the two electrodes. Use of a capacitive proximity sensor may have the advantage of being more likely to be triggered by a human body than by inanimate objects, such as being near or in contact with a piece of cloth or plastic. Further, because capacitive proximity sensors can be triggered if a portion of a human body is near but not touching the capacitive proximity sensor, the portion of the human body may trigger the capacitive proximity sensor through thin materials such as cloth (e.g., pants, gloves) and/or mobile device cases.

Proximity sensors, which may be capacitive proximity sensors, may be arranged on a mobile device (e.g., a cellular phone, smart phone, gaming device, etc.) to detect where the mobile device is located in relation to the body of a user. To do this, dual-electrode capacitive proximity sensors or single-electrode capacitive proximity sensors can be used. A first capacitive proximity sensor may be positioned such that its electrodes are on opposite sides of the mobile device in positions that are typically near where a user would grip the mobile device with a hand. Such a capacitive proximity sensor may be used to determine when the mobile device is (likely) being gripped by a user. A second capacitive proximity sensor may have electrodes in proximity to a speaker of the mobile device. Such a capacitive proximity sensor may be used to determine when the user's ear is (likely) near the speaker. Data from such capacitive proximity sensors may be used to determine a location of the mobile device in relation to the user, such as in the user's hand and held to an ear of the user. Alternatively, individual single-electrode capacitive proximity sensors may be used instead of each electrode of a dual-electrode capacitive proximity sensor.

Using proximity data from one or more of such proximity sensors in conjunction with data from one or more other sensors may permit the mobile device to identify a function, such as an application, that the user is likely to want to execute. Acceleration data from an accelerometer may be used to determine the orientation of the mobile device in relation to the user. Using proximity data, such as proximity data derived from the proximity sensors discussed above, it may be determined when the mobile device is likely in contact with or near to (collectively referred to as "proximate") an ear of the user. For example, when both the first proximity sensor and the second proximity sensor provide data indicating a user's body is proximate to each sensor, the mobile device may be determined to be held to an ear of the user.

In such an arrangement, acceleration data may be used to determine which ear the mobile device is being held against. Since the mobile device may typically be held at an angle to the user's head, such that the speaker of the mobile device is proximate to the user's ear and the microphone is proximate to the user's mouth, which direction, in relation to the mobile device, that gravity acts on the accelerometer may be used to determine which ear the mobile device is being held against (the acceleration of gravity may be sensed in opposite directions along the same axis of the mobile device depending on whether the mobile device is held to the left or right ear of the user). Based on which ear the mobile device is being held to, a different application may be executed by the mobile device. For example, if the user holds the mobile device to the user's left ear (when a call is not being placed or received), the mobile device may execute voice recognition software; if the user holds the mobile device to the user's right ear (also when a call is not being placed or received), the mobile device may execute a different application, such as a voice memo program. As a third option, if the mobile device is held in front of the user's mouth, such that the proximity sensor associated with the speaker is not in contact with an ear, the mobile device may execute a third application. Which application is launched in each situation may be customized by the user. Such an arrangement may permit various functions of the mobile device to be launched without the mobile device's display screen being activated (thus, saving power). While the function is being selected and executed, the display of the mobile device may remain deactivated. The mobile device may cease executing the function when the mobile device is moved away from the user's ear, as indicated by proximity data received from the proximity sensor located near the user's ear.

Various systems and methods may be implemented as detailed above. FIG. 1 illustrates an embodiment of a system 100 configured to select a function to be executed by a mobile device. System 100 includes: processor 110, proximity sensors 120, accelerometer 130, display 140, and storage 150. System 100 may be part of a larger system. For example, system 100 may be part of a mobile device that contains additional components. For example, the mobile device that system 100 may be a part of may be a smartphone, a cellular phone, a tablet computer, a personal digital assistant, or gaming device, to name only a few examples. System 100 may be part of the computer system, such as computer system 600 of FIG. 6.

Processor 110 may represent a general purpose or specialized processor configured to process data received from one or more sensors, such as proximity sensors 120 and accelerometer 130, and interact with storage 150 and display 140.

Processor 110 may be in communication with proximity sensors 120. System 100 may include one or more proximity sensors 120. As such, some embodiments may have two, three, four, or more proximity sensors in communication with processor 110. Each proximity sensor, such as proximity sensor 120-1, may include a single-electrode capacitive proximity sensor. In some embodiments, one or more of the proximity sensors may be dual-electrode capacitive proximity sensors. As such, each proximity sensor, such as proximity sensor 120-1, may include one or two electrodes. Each of these proximity sensors may periodically transmit proximity data to processor 110 that indicates whether a triggering entity is within range of the proximity sensor. Proximity data may include a magnitude value that indicates how close a triggering entity is to the electrode(s) of the proximity sensor. The triggering entity may be any entity that causes the capacitance measured by the proximity sensor to change. When being used by a user, the user's body may serve as the triggering entity. As such, a user's hand near a proximity sensor may be sensed by the proximity sensor. Such proximity sensors may be configured to determine when a triggering entity is in contact with the proximity sensor and/or when the triggering entity is close to the proximity sensor (collectively referred to as proximate) to the proximity sensor. As such, for a proximity sensor of proximity sensors 120 to detect the presence of a triggering entity, the triggering entity does not need to be in direct contact with one or more electrodes of the proximity sensor.

While the above description of proximity sensors focuses on the use of capacitive proximity sensors, it should be understood that in some embodiments proximity sensors other than capacitive proximity sensors may be used. Further, some embodiments may use multiple types of proximity sensors; for example, a mobile device may contain both single-electrode and dual-electrode capacitive proximity sensors and/or other types of proximity sensors.

Processor 110 may also be in communication with one or more accelerometers, such as accelerometer 130. Accelerometer 130 may provide acceleration data to processor 110. Such acceleration data may indicate a direction of acceleration and a magnitude of acceleration. For example, at least when approximately still, the effect of gravity on accelerometer 130 may result in acceleration data from accelerometer 130 indicating a direction toward the ground and having a magnitude similar to the acceleration of gravity (9.8 m/s$^2$). In some embodiments, more accurate results may be achieved by using acceleration data from multiple accelerometers. Such acceleration data may be averaged or otherwise combined by processor 110.

Processor 110 may also be in communication with display 140. Display 140 may be used to visually present text and/or graphics to a user of mobile device. Whether display 140 is active or inactive (e.g., turned on or off) may be based on data received from proximity sensors 120. For example, display 140 may be activated when proximity data from proximity sensors 120 indicate that the mobile device containing system 100 is being held in the hand of the user. If data from proximity sensors 120 indicate that the mobile device containing system 100 is being held in the hand of the user and is likely proximate to an ear of a user, display 140 may be inactivated because the user is unlikely to be viewing display 140. When data from proximity sensors 120 indicate that the mobile device has been moved away from an ear of the user, display 140 may be reactivated. As such, power consumed by display 140 may be decreased by decreasing the amount of time that display 140 is active.

Processor 110 may be able to read data from and write data to storage 150. Storage 150 may be used to store indications of which function of the mobile device should be activated based on the position of the mobile device in relation to the user. Such indications may be referred to as customization data. For example, a first function (such as an application or built-in capability, such as placing a phone call) may be the left ear of the user and a second function may be associated with the right ear of the user. Additional functions may be associated with other positions in relation to the user, such as when the mobile device is held in front of the user's mouth. Storage 150 may be used to store an indication of which function is associated with which location in relation to the user.

Figure 2C:
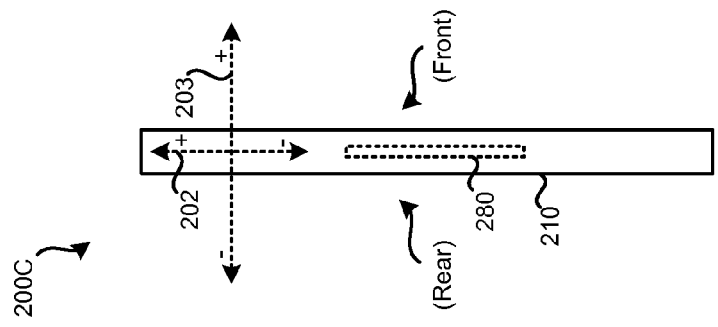
FIG. 2C illustrates a side view of an embodiment of a mobile device configured to select a function to be executed.
Figure 2B:
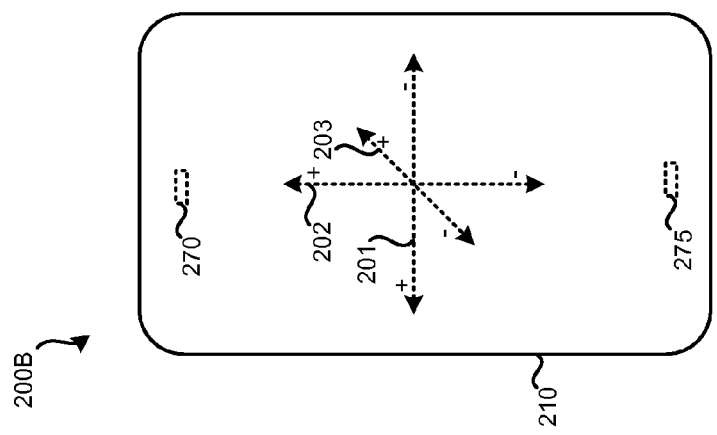
FIG. 2B illustrates a rear view of an embodiment of a mobile device configured to select a function to be executed.
Figure 2A:
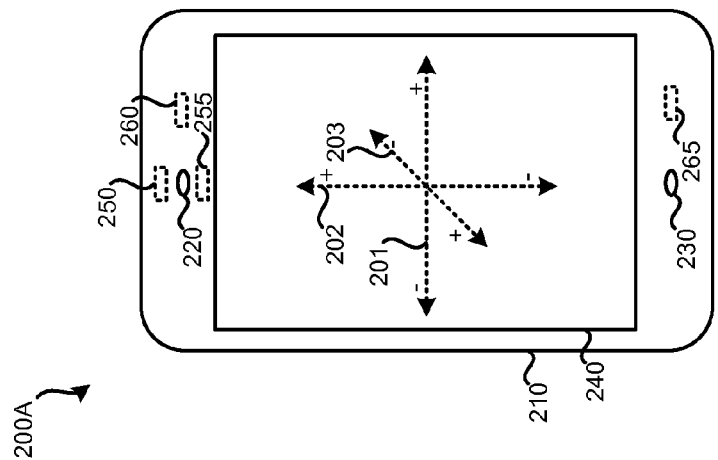
FIG. 2A illustrates a front view of an embodiment of a mobile device configured to select a function to be executed.

FIG. 2A illustrates an embodiment of a mobile device 200A configured to select a function to be executed from a front view. Mobile device 200A may include system 100 of FIG. 1 or some other system configured to allow a function to be selected based on the position of the mobile device in relation to a user. As illustrated, the front of mobile device 200A contains display 240. Mobile device 200A may include case 210. Mobile device 200A may also include speaker 220 and microphone 230. Coupled with case 210 may be a plurality of proximity sensors, such as proximity sensors 250, 255, 260, and 265. Proximity sensors 250 and 255 may represent two single-electrode proximity sensors or two electrodes of a single dual-electrode proximity sensor. Proximity sensors 250 and 255 may be used to determine when the speaker of mobile device 200A is likely proximate to a user's ear. Proximity sensors 260 and 265 may represent two single-electrode proximity sensors or two electrodes of a single dual-electrode proximity sensor. Proximity sensors 260 and 265 may be used to determine when mobile device 200A is against the body of the user, such as in a shirt or pant pocket. Proximity sensors 260 and 265 may be separated from each other enough such that the presence of common pocket items, such as change and/or keys, does not function as the triggering entity. Each proximity sensor is illustrated using dotted lines to indicate that each proximity sensor may not be visible external to mobile device 200A, rather each proximity sensor may be located within case 210 such that the proximity sensors are not visible to a user. In some embodiments, the proximity sensors may be arranged to be externally visible.

FIG. 2B illustrates an embodiment of a mobile device configured to select a function to be executed from a rear view. Mobile device 200B may be mobile device 200A of FIG. 2A viewed from a different perspective (e.g., from the rear of mobile device 200A such that display 240 is not visible). Coupled with the rear of case 210 may be a plurality of proximity sensors, such as proximity sensors 270 and 275. Proximity sensors 270 and 275 may represent two single-electrode proximity sensors or two electrodes of a single dual-electrode proximity sensor. Proximity sensors 270 and 275 may be used to determine when mobile device 200B is against the body of the user, such as in a shirt or pant pocket. Proximity sensors 270 and 275 may be separated from each other enough such that the presence of common pocket items, such as change and/or keys, is not mistaken for a triggering entity. Proximity sensors 270 and 275 are illustrated using dotted lines to indicate that each proximity sensor may not be visible, rather each proximity sensor may be located within case 210 such that the proximity sensors are not visible externally. The number of proximity sensors on mobile device 200B is for example purposes only, more or fewer proximity sensors may be present on each side.

FIG. 2C illustrates an embodiment of a mobile device 200C configured to select a function to be executed from a side view. Mobile device 200C may be mobile device 200A of FIG. 2A/or and mobile device 200B of FIG. 2B viewed from the left side. Proximity sensor 280 may be present on mobile device 200C. Proximity sensor 280 may be a single-electrode capacitive proximity sensor or may represent an electrode of a dual-electrode proximity sensor. Another proximity sensor (or electrode of a dual-electrode capacitive proximity sensor) may be on the opposite (right) side of mobile device 200C. As such, proximity to the region where a user typically grips the mobile device during use (e.g., conducting a phone call or, more generally, when talking into the microphone with the speaker proximate to an ear) may be sensed by proximity sensor 280 (and the complementary proximity sensor or electrode on the right side).

Also illustrated in FIGS. 2A through 2C are imaginary axes, represented by dotted arrows. Such axes are in a coordinate system of the mobile device. The direction of acceleration as detected by one or more accelerometers of the mobile devices may be interpreted in accordance with such a coordinate system. Referring to FIG. 2A, x-axis 201 is positive to the right (as illustrated) and negative to the left (as illustrated). Y-axis 202 is positive toward the top (as illustrated) of mobile device 200A, and negative toward the bottom (as illustrated). Z-axis 203 passes through mobile device 200A as illustrated in FIG. 2C. The polarity of x-axis 201 and z-axis 203 appear reversed in FIG. 2B; this is because the mobile device is flipped, as such, to remain in the coordinate system of the mobile device, these axes flip with the device. FIG. 2C illustrates y-axis 202 and z-axis 203. In FIG. 2C, the front of the device containing display 240 is on the right (as illustrated).

Typically, when a user holds a mobile device to one of the user's ears, the mobile device is held at an angle. The angle allows a speaker of the mobile device to be near the user's ear while the microphone is near the user's mouth. An accelerometer can be used to determine which ear the mobile device is being held to be sensing the direction of gravity: a horizontal component of an acceleration measurement in the frame of reference of the mobile device may be in opposite directions based on which ear the mobile device is being held to. Referring to FIG. 2A, acceleration along x-axis 201 would be in opposite directions based on which ear the mobile device is held to (assuming the speaker of the mobile device is proximate to the user's ear). As such, whether the mobile device is against a left ear or a right ear of a user may be determined.

Figure 3B:
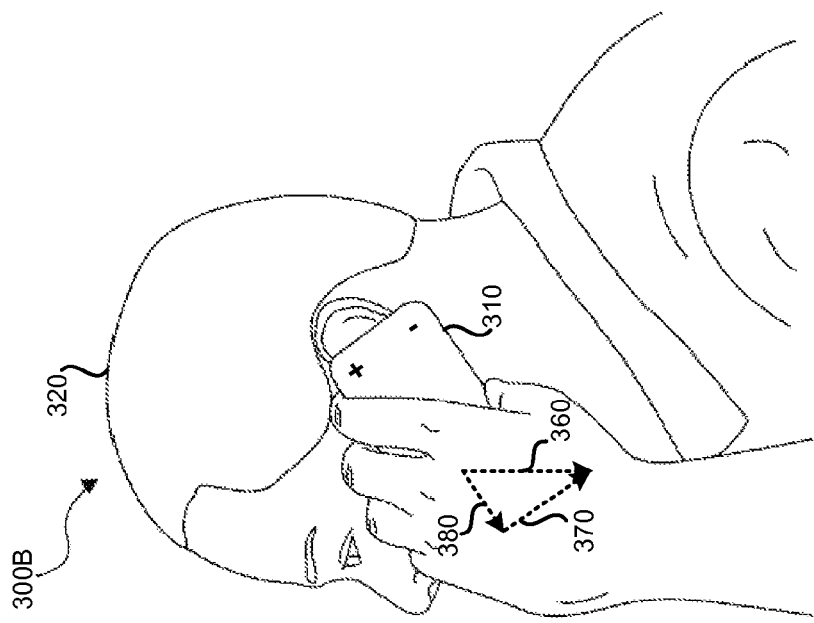
FIG. 3B illustrates an embodiment of a mobile device configured to select a function to be executed by the mobile device being held to a user's left ear.
Figure 3A:
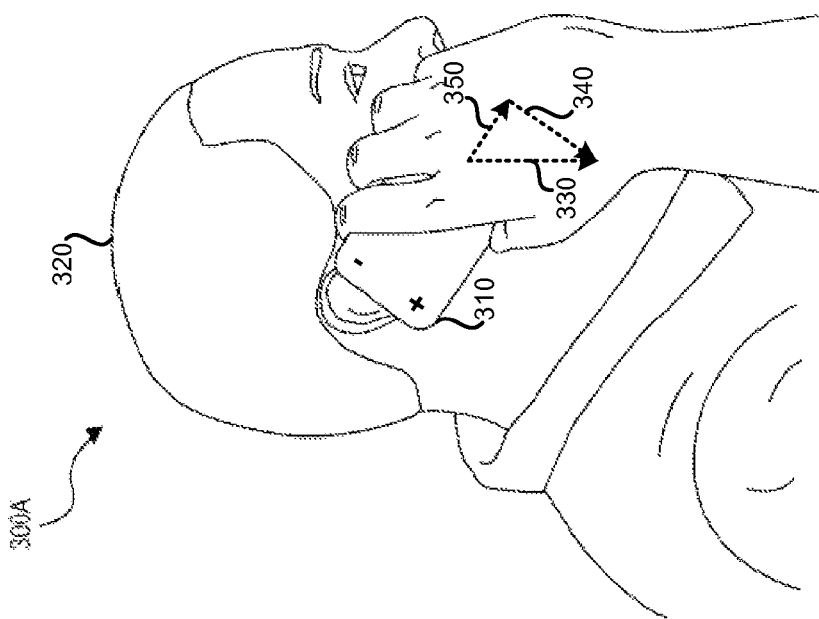
FIG. 3A illustrates an embodiment of a mobile device configured to select a function to be executed by the mobile device being held to a user's right ear.

FIG. 3A illustrates an embodiment 300A of a mobile device 310 configured to select a function to be executed being held to a user's right ear. Mobile device 310 may be the mobile device of FIGS. 2A, 2B, and/or 2C, or some other mobile device. Mobile device 310 may include system 100 of FIG. 1 or some other system configured to select a function to be executed by the mobile device.

In FIG. 3A (and FIG. 3B), a "+" and "−" are present on opposite sides of the rear of the case of mobile device 310. These symbols are for illustrative purposes only and are intended to show that the sides of mobile device 310 vary in position depending on whether mobile device 310 is held to the user's left or right ear.

In FIG. 3A, user 320 is holding mobile device 310 to the user's right ear. As illustrated, the mobile device is proximate to a hand of the user and the user's ear. Referring to FIG. 2A, the user's right ear may trigger proximity sensors 250 and 255 to provide proximity data that indicates a triggering entity (in this case the user's ear) is proximate to proximity sensors 250 and 255. Referring to FIG. 2C, proximity sensor 280, and a corresponding proximity sensor on the opposite side of the mobile device, may provide proximity data that indicates a triggering entity (in this case, the hand of the user) is proximate to proximity sensor 280 and the corresponding proximity sensor on the other side of the mobile device.

Vectors 330, 340, and 350 are represented by imaginary arrows and serve to represent the effect of gravity as measured by an accelerometer of mobile device 310. An accelerometer of mobile device 310 may measure the effects of gravity on (the accelerometer of) mobile device 310 as vector 330. As such vector 330 points approximately toward the center of the earth. Vectors 340 and 350 represent components of vector 330 in a coordinate system of mobile device 310, such as illustrated in FIG. 2A. As such, vector 350 represents a component of the acceleration caused by vector 330 along a y-axis of mobile device 310 and vector 340 represents acceleration along the x-axis of mobile device 310. As illustrated, in relation to the imaginary positive and negative signs of mobile device 310, the magnitude along the x-axis of mobile device 310 caused by gravity vector 330 is positive (that is, moving toward the positive sign).

FIG. 3B illustrates an embodiment 300B of mobile device 310 configured to select a function to be executed by the mobile device being held to a user's left ear. As in FIG. 3A, mobile device 310 may be the mobile device of FIGS. 2A, 2B, and/or 2C, or some other mobile device. Mobile device 310 may include system 100 of FIG. 1 or some other system configured to select a function to be executed by the mobile device.

In FIG. 3B, user 320 is holding mobile device 310 to the user's left ear (as opposed to the user's right ear in FIG. 3A). As illustrated, the mobile device is proximate to a hand of the user and the user's left ear. Referring to FIG. 2A, the user's left ear may trigger proximity sensors 250 and 255 to provide proximity data that indicates a triggering entity (in this case the user's ear) is proximate to proximity sensors 250 and 255. Referring to FIG. 2C, proximity sensor 280, and a corresponding proximity sensor on the opposite side of the mobile device, may provide proximity data that indicates a triggering entity (in this case, the hand of the user) is proximate to proximity sensor 280 and the corresponding proximity sensor on the other side of the mobile device.

Vectors 360, 370, and 380 are represented by imaginary arrows and serve to represent the effect of gravity as measured by an accelerometer of mobile device 310. As described in relation to FIG. 3A, an accelerometer of mobile device 310 may measure the effects of gravity on (the accelerometer of) mobile device 310 as vector 360. Vector 360 may be measured to be in the same direction (in a global coordinate system) and have the same magnitude as vector 330 of FIG. 3A. Like vector 330, vector 360 points approximately toward the center of the earth. Vectors 370 and 380 represent components of vector 360 in the coordinate system of mobile device 310. As such, vector 380 represents a component of vector 360 along the y-axis of mobile device 310 and vector 370 represents a component of vector 360 along the x-axis of mobile device 310. As illustrated, in relation to the imaginary positive and negative signs of mobile device 310, the magnitude along the x-axis of mobile device 310 caused by gravity vector 330 is negative (that is, moving towards the negative sign). Accordingly, the direction of acceleration caused by gravity along the x-axis of mobile device 310 is in opposite directions depending on which ear the mobile device is proximate to.

Figure 3C:
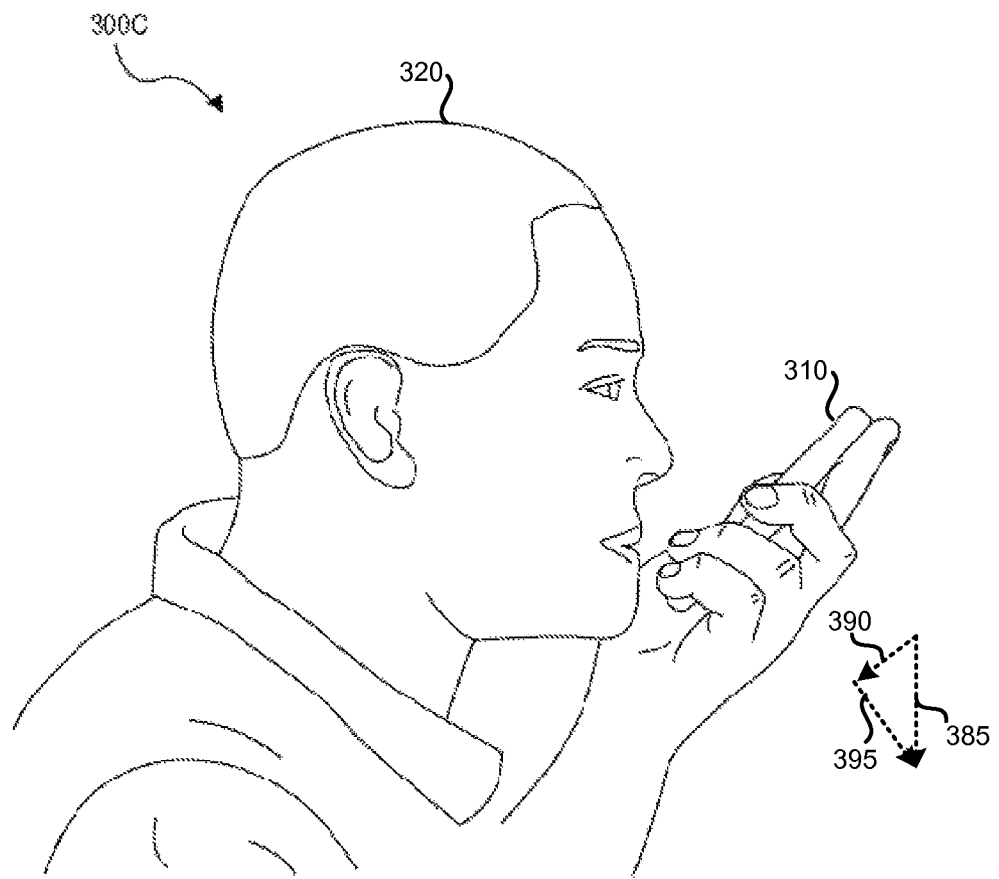
FIG. 3C illustrates an embodiment of a mobile device configured to select a function to be executed by the mobile device being held in front of a user's mouth.

FIG. 3C illustrates an embodiment 300C of a mobile device configured to select a function to be executed by the mobile device being held in front of a user's mouth. In embodiment 300C, user 320 is holding mobile device 310 in front of his mouth. In some embodiments, this may result in mobile device 310 executing a different function than if mobile device 310 was held to either the user's left or right ear. As described in relation to FIG. 3A and FIG. 3B, an accelerometer of mobile device 310 may measure the effects of gravity on (the accelerometer of) mobile device 310 as vector 385. Vector 385 may be measured to be in approximately the same direction (in a global coordinate system) and have approximately the same magnitude as vector 330 of FIG. 3A and vector 360 of FIG. 3B, because the acceleration and direction of gravity does not change. Vectors 390 and 395 represent components of vector 385 in the coordinate system of mobile device 310. As such, vector 390 represents a component of vector 385 along the y-axis of mobile device 310 and vector 395 represents a component of vector 385 along the z-axis of mobile device 310.

Acceleration data from the accelerometer of mobile device 310 in combination with proximity data from one or more proximity sensors of mobile device 310 may be used to determine that the mobile device is being held in front of the mouth of user 320. Referring to mobile device 200A, proximity data from proximity sensors 250 and 255 may indicate that mobile device 200A is not being held against an ear of a user. Referring to FIG. 2C, proximity data received from proximity sensor 280 and/or a corresponding proximity sensor on the other side of mobile device 200C may indicate that user 320 is gripping the mobile device. Additionally, one or more proximity sensors in the region of microphone 230 may be used to determine that the mobile device is likely being held close to the user mouth. As such, the acceleration data that indicates the mobile device is being held at an angle, as indicated in FIG. 3C, in combination with proximity data that indicates user 320 is gripping mobile device 310 and/or that mobile device 310 is proximate to the mouth of user 320 may be used to determine that a third function of mobile device 310 is to be executed. Therefore, based on whether mobile device 310 is being held to the left ear of user 320, the right ear of user 320, or in front of the mouth of user 320 may be used to execute three different functions of mobile device 310. In some embodiments, functions of mobile device 310 may be executed based on other positions of mobile device 310 in relation to user 320.

Figure 4:
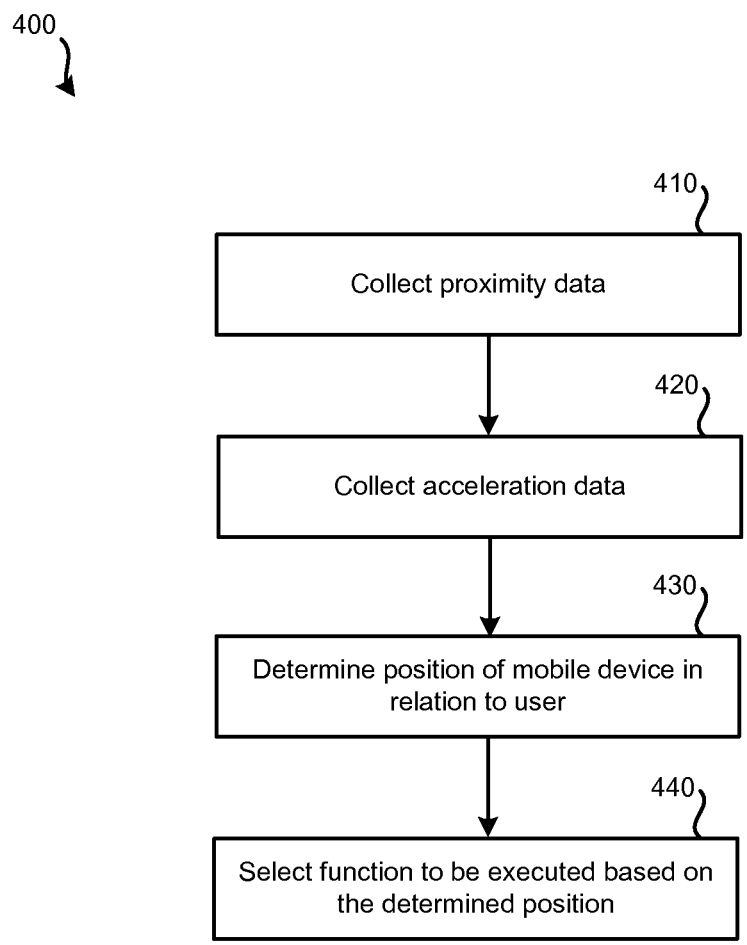
FIG. 4 illustrates an embodiment of a method for selecting a function to be executed by a mobile device.

Various methods may be performed in conjunction with system 100 of FIG. 1 and the various embodiments of mobile devices described in FIGS. 2A through 3C, which may contain system 100 of FIG. 1 or a system similar to system 100 of FIG. 1. FIG. 4 illustrates an embodiment of method 400 for selecting a function to be executed by a mobile device. Method 400 may be performed using system 100. Method 400 may also be performed using some other form of system that is configured to select a function to be executed by a mobile device. For example, method 400 may be performed by mobile devices 200A, 200B, and 200C (which all may be views of the same mobile device from different angles). Such a mobile device may be held by a user in positions as detailed in FIGS. 3A, 3B, and/or 3C. Method 400 may also be used for selecting a function to be executed by a mobile device based on some other position of the mobile device in relation to a user.

At step 410, proximity data may be collected using one or more proximity sensors of a mobile device. Such proximity data may indicate: 1) whether a triggering entity, such as a user's body part, is in proximity (touching or near) to the proximity sensor and/or 2) a magnitude. Such a magnitude may be greater the closer a triggering entity is to the proximity sensor. As such, it may be possible to adjust sensitivity to triggering entities by setting a threshold magnitude used to determine whether a triggering entity is considered proximate to the proximity sensor or not. The greater the threshold, the closer the triggering entity may need to be to the proximity sensor for the triggering entity to be considered proximate to the proximity sensor. In some embodiments, if no proximity data is received from a proximity sensor, it may be assumed that a triggering entity is not proximate to the proximity sensor. Means for capturing proximity data may include a mobile device and, more specifically, one or more proximity sensors located on a mobile device. The proximity sensors used in method 400 may be single- or dual-electrode capacitive proximity sensors.

At step 420, acceleration data may be captured using one or more accelerometers of the mobile device. Such acceleration data may indicate: 1) a direction of acceleration; and 2) a magnitude of acceleration. Such acceleration data may periodically be received by one or more processors of the mobile device. The direction of the acceleration may use a coordinate system of the mobile device. Means for capturing acceleration data may include one or more accelerometers of a mobile device, or some other device configured to determine a direction of gravity.

At step 430, a position of the mobile device in relation to the user may be identified. Such identification of the position may involve using the acceleration data received at step 420 and the proximity data received at step 410. In some embodiments, the acceleration data received at step 420 may be evaluated if the proximity data received at step 410 indicates that the mobile device is in a location in relation to the user that may correspond to the execution of a function by the mobile device. As an example, if the proximity data received at step 410 indicates that the mobile device is likely located within a pocket of the user, the acceleration data received at step 420 may not be evaluated to determine a function that should be executed. However, if the proximity data received at step 410 is indicative of the mobile device being in a position that may correspond to a function being executed, acceleration data received at step 420 may be evaluated. As an example of this, if the proximity data received at step 410 is indicative of the mobile device being gripped by the user and of the mobile device likely being against an ear of the user (e.g., a proximity sensor near a speaker of the mobile device is proximate to a triggering entity), the acceleration data received at step 420 may be evaluated.

Further, at step 430, when the proximity data has been evaluated such that it is determined that the mobile device is in a position that may correspond to a function, the acceleration data may be evaluated. While the proximity data received at step 410 may be used to determine that the mobile device is likely proximate to an ear of a user, the acceleration data received at step 420 may be used to determine specifically which ear the mobile device is proximate to. Based upon whether the acceleration along an x-axis (or some other axis) in a coordinate system of the mobile device is positive or negative, it can be determined which ear the mobile device is being held to. Referring to FIG. 3A, vector 340 shows acceleration along the x-axis of mobile device 310 in the coordinate system of the mobile device in a negative direction. Based on this, the mobile device may be determined to be held to the right ear of the user. When the mobile device is held to the right ear of the user, acceleration may be expected to be in the positive direction along the x-axis of the mobile device because the user, while using a mobile device, will likely want the microphone of the mobile device proximate to the user's mouth and the speaker of the mobile device proximate to the user's ear. Referring to FIG. 3B, vector 370 shows acceleration along the x-axis of mobile device 310 in the coordinate system of the mobile device in a negative direction. Based on this, the mobile device may be determined to be held to the left ear of the user. When the mobile device is held to the left ear of the user, acceleration may always be expected to be in the negative direction along the x-axis of the mobile device because the user, while using a mobile device, will likely want the microphone of the mobile device proximate to the user's mouth and the speaker of the mobile device proximate to the user's ear, thus resulting in acceleration in an opposite direction along the x-axis in the coordinate system of the mobile device as compared to when the mobile device is held to the user's right ear. It should be understood that the coordinate system used by the mobile device can be reoriented while maintaining the functionality described herein. Means for identifying the position of the mobile device in relation to a user may be one or more processors or some other device configured to process proximity data and acceleration data.

As such, at step 430, if proximity data is used to determine the mobile device is being held to an ear, the direction of acceleration (such as whether the acceleration is positive or negative along an x-axis in a coordinate system of the mobile device) may be used to determine which ear the mobile device is being held to. While method 400 details determining whether the mobile device is being held proximate to the user's left ear or the user's right ear, it should be understood that a similar method may be used for determining whether the mobile device is in additional locations proximate to the user, such as held in front of the user's mouth, as depicted in FIG. 3C.

At step 440, a function of the mobile device to be executed may be selected based upon the position identified at step 430. Such a function may be an application that is installed on the mobile device. The function may also be a built-in feature of the mobile device, such as the ability to record a voice memo or place a phone call. Based on which location the mobile device is determined to be in relation to the user, such as held to a left or right ear, a different function may be selected to be executed. As such, for example, if the left ear is associated with voice memos and the right ear with phone calls, the user may select which ear to hold the mobile device to based on which function the user wishes to perform. Further, by basing which function is selected based on which ear of the mobile device is held to, it may be possible for the function to be selected without the display of the mobile device being activated. As such, during entire method 400, a display of the mobile device may be inactive, thus saving power. In some embodiments, the display may only be disabled for portions of method 400 if the battery charge is below a threshold value. Following step 440, the function selected may be executed. Means for selecting the function of the mobile device to be executed may be one or more processors or some other device configured to process proximity data and acceleration data. Further, it should be understood that the means to perform the steps of method 400 may, more generally, be a mobile device, such as a smartphone, cellular phone, gaming device, PDA, etc.

Figure 5:
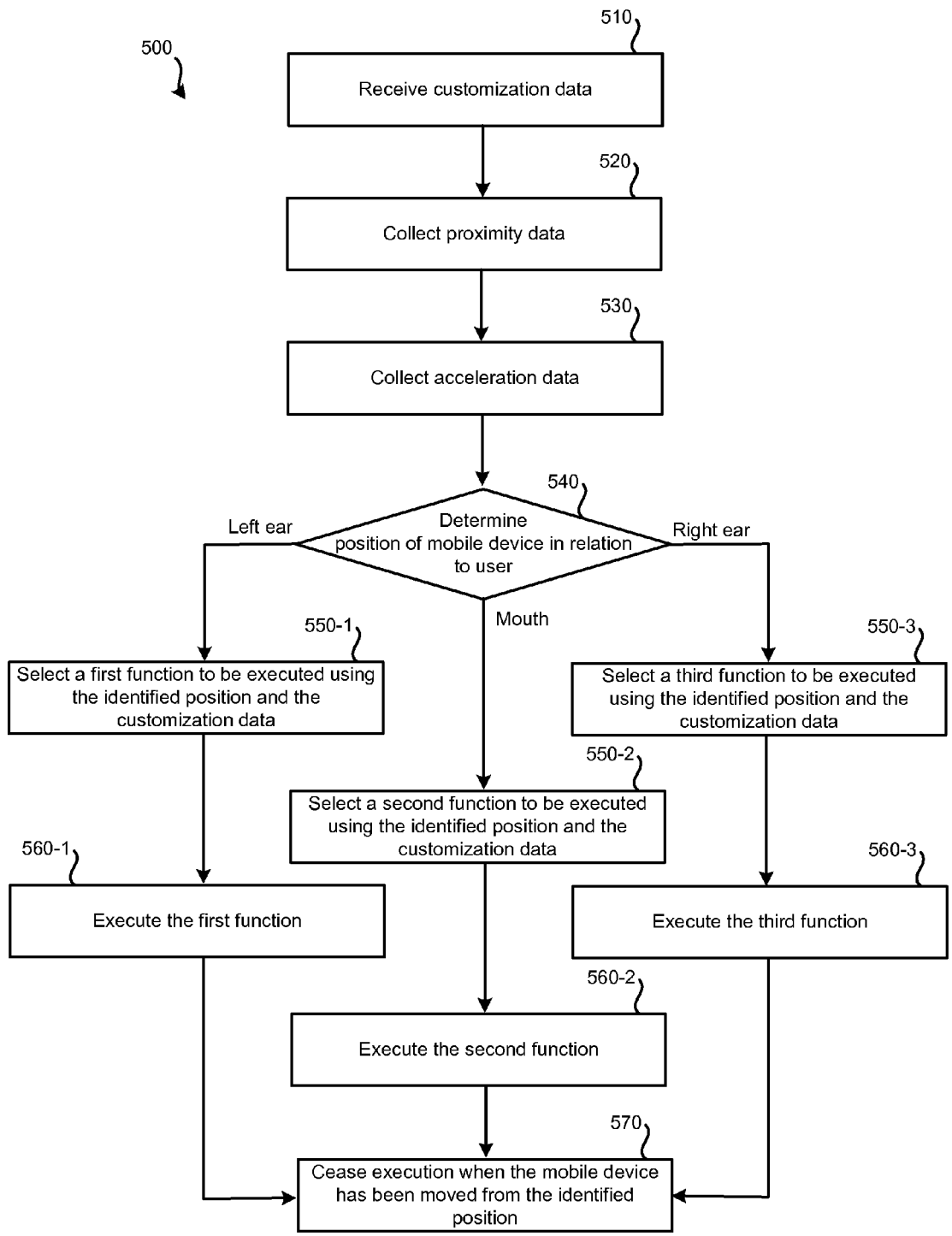
FIG. 5 illustrates another embodiment of a method for selecting a function to be executed by a mobile device.

FIG. 5 illustrates another embodiment of method 500 for selecting a function to be executed by a mobile device. Method 500 may be performed using system 100. Method 500 may also be performed using some other form of system that is configured to select a function to be executed by a mobile device. For example, method 500 may be performed by mobile devices 200A, 200B, and 200C (which each may be different views of the same mobile device). Such a mobile device may be held by a user in positions as detailed in FIGS. 3A, 3B, and/or 3C. Method 500 may also be used to select a function to be executed by a mobile device based on some other position of a mobile device in relation to a user. Method 500 may be a more detailed description of method 400 or a separate method.

At step 510, customization data may be received. Such customization data may indicate a function of the mobile device that a user desires to have associated with a particular position in relation to the user. For example, a user may specify a function that the user desires to be executed when the mobile device is held to a left ear of the user; a different function may be specified for the user's right ear. (Of course, the function may not be executed in certain situations, such as if the user is attempting to answer an incoming call). The user may also specify other functions to be executed by the mobile device for other locations in relation to the user, such as if the mobile device is held in front of the user's mouth. Means for receiving customization data may include a touchscreen, keypad, keyboard, or some other user input device of or coupled with the mobile device.

At step 520, proximity data may be captured by the mobile device. More specifically, proximity data may be captured using one or more proximity sensors on a mobile device by a processor of the mobile device. Such proximity data may indicate: 1) whether a triggering entity, such as a user's body part (e.g., ear, mouth, hand), is in proximity (touching or near) to the one or more proximity sensors and/or 2) a magnitude (possibly for each proximity sensor). Such a magnitude may be greater the closer a triggering entity is to the proximity sensor. As such, it may be possible to adjust sensitivity to a triggering entity by setting a threshold magnitude used to determine whether a triggering entity is considered proximate to the proximity sensor. The greater the threshold, the closer the triggering entity may need to be to the proximity sensor for the triggering entity to be considered proximate to the proximity sensor. In some embodiments, if no proximity data is received from a proximity sensor, it may be assumed that a triggering entity is not proximate to the proximity sensor. The proximity data received at step 520 may be received by one or more processors of a mobile device. Means for capturing the proximity data may be one or more proximity sensors of a mobile device. The proximity sensors used in method 500 may, for example, be single- or dual-electrode capacitive proximity sensors.

At step 530, acceleration data may be captured by the mobile device. Such acceleration data may indicate: 1) a direction of acceleration; and, possibly, 2) a magnitude of acceleration. Such acceleration data may periodically be received by one or more processors of the mobile device. Means for receiving acceleration data may include one or more accelerometers of a mobile device or some other device configured to determine the direction of gravity.

At step 540, the proximity data received at step 520 may be evaluated such that it is determined whether the mobile device may be in a position that corresponds to a function to be executed, and, if so, identify the position in relation to the user using the acceleration data. In some embodiments, such a determination may be performed before the acceleration data of step 530 is received and/or processed. As such, acceleration data may not be collected and/or processed unless the proximity data received at step 520 indicates a function may be executed based on the position of the mobile device.

The proximity data received at step 520 may be used to determine that the mobile device is likely proximate to a user. For example, the mobile device may be identified as likely proximate to an ear of a user based on proximate data from a grip proximity sensor and a proximity sensor near a speaker of the mobile device each indicating proximity to triggering entities (e.g., a hand and ear, respectively). The acceleration data received at step 530 may be used to determine which ear, or other part of the user, such as the mouth, the mobile device is proximate to. In some embodiments, acceleration data is used in conjunction with proximity data to determine if the mobile device is in a position corresponding to a function.

Based upon whether the acceleration along an x-axis in a coordinate system of the mobile device is positive or negative, it can be determined which ear the mobile device is being held to. As detailed in relation to method 400 of FIG. 4, referring to FIG. 3A, vector 340 shows acceleration along the x-axis of mobile device 310 in the coordinate system of the mobile device in a positive direction. Based on this, the mobile device may be determined to be held to the right ear of the user. When the mobile device is held to the right ear of the user, acceleration may always be expected to be in the positive direction along the x-axis of the mobile device because the user, while using a mobile device, will likely want the microphone of the mobile device proximate to the user's mouth and the speaker of the mobile device proximate to the user's ear. Referring to FIG. 3B, vector 370 shows acceleration along the x-axis of mobile device 310 in the coordinate system of the mobile device in a negative direction. Based on this, the mobile device may be determined to be held to the left ear of the user. When the mobile device is held to the left ear of the user, acceleration may always be expected to be in the negative direction along the x-axis of the mobile device because the user, while using a mobile device, will likely want the microphone of the mobile device proximate to the user's mouth and the speaker of the mobile device proximate to the user's ear, thus resulting in acceleration in an opposite direction along the x-axis in the coordinate system of the mobile device as compared to when the mobile device is held to the user's right ear. Means for identifying the position of the mobile device in relation to a user may be one or more processors or some other device configured to process proximity data and acceleration data.

Additionally, besides determining which ear the mobile device is being held to, at step 540 proximity data and acceleration data may be used to identify some other position of the mobile device in relation to the user, such as the mobile device being held to the user's mouth. For example, if proximity data received at step 520 indicates that the mobile device is likely being gripped and is proximate to the user's mouth (but is not proximate to an ear of the user), it may be determined that the mobile device is likely being held in front of the user's mouth, such as illustrated in FIG. 3C. If it is determined as such, the acceleration data may not be used. Alternatively, in some embodiments the acceleration data may be used to confirm that the mobile device is being held at an angle consistent with the user holding the mobile device in front of the user's mouth such as illustrated in FIG. 3C. In some embodiments, it may be possible that different angles are associated with different functions when the mobile device is held in front of the user's mouth. As such, the acceleration data received at step 530 may be used to identify the angle the mobile device is being held in front of the user's mouth at step 540 such that different functions may be executed based on the angle. For example, if the mobile device is determined to be held in front of the user's mouth, a different function may be performed for: 1) the mobile device being held with the speaker of the mobile device elevated (as illustrated in FIG. 3C); 2) the mobile device being held flat; and 3) the mobile device being held with the microphone of the mobile device elevated.

Based on a determination of step 540, in the illustrated embodiment of the method 500, either step 550-1, step 550-2, or step 550-3 is performed. Step 550-1 is performed if the mobile device is determined to be held to the left ear of the user based on the proximity data and acceleration data received at steps 520 and 530, respectively. At step 550-1, a first function to be executed based on the identified position of step 540 may be selected. The function selected at step 550-1 may also be based on the customization data received at step 510, where the user may have specified which function of the mobile device is to be associated with the position of being held to the left ear of the user. At step 560-1, the first function selected at step 550-1 may be executed. Means for selecting and executing the first function may include one or more processors.

If at step 540, the mobile device was determined to be held to the mouth of the user based on the proximity data received at step 520 (and possibly the acceleration data received at step 530), step 550-2 may be performed. At step 550-2, a second function to be executed based on the identified position of step 540 may be selected. The function selected at step 550-2 may also be based on the customization data received at step 510, where the user may have specified which function of the mobile device is to be associated with the position of being held to the mouth of the user. At step 560-2, the second function selected at step 550-2 may be executed. Means for selecting and executing the second function may include one or more processors.

If at step 540, the mobile device was determined to be held to the right ear of the user based on the proximity data and acceleration data received at steps 520 and 530, respectively, step 550-3 may be performed. At step 550-3, a third function to be executed based on the identified position of step 540 may be selected. The function selected at step 550-3 may also be based on the customization data received at step 510, where the user may have specified which function of the mobile device is to be associated with the position of being held to the right ear of the user. At step 560-3, the third function selected at step 550-3 may be executed. Means for selecting and executing the third function may include one or more processors.

At step 570, execution of step 560 may be ceased. Ceasing the execution of the function being performed may be based on when the mobile device is moved from the identified position. For example, if at step 540, the mobile device was determined to be held to the left ear of the user, when the user moves the mobile device away from his left ear, execution of the first function may be stopped. Determining whether the mobile device is moved away from identified position may be based on additional received proximity data and/or acceleration data. For example, proximity data many indicate that the mobile device is no longer in proximity to an ear of the user. Additionally or alternatively, acceleration data may indicate movement from the position identified at step 540. This movement data may be used instead of, or in addition to, proximity data to determine one the mobile devices been moved from the identified position. Means for ceasing execution may include one or more processors.

By basing which function is selected based on where the mobile device is located in relation to the user, it may be possible for the function to be selected without the display of the mobile device being used. As such, during method 500, a display of the mobile device may be inactive, thus saving power. In some embodiments, the display may only be disabled for portions of method 500 if the battery charge is below a threshold value. It should be understood that the means to perform the steps of method 500 may, more generally, be a mobile device, such as a smartphone, cellular phone, gaming device, PDA, etc.

Figure 6:
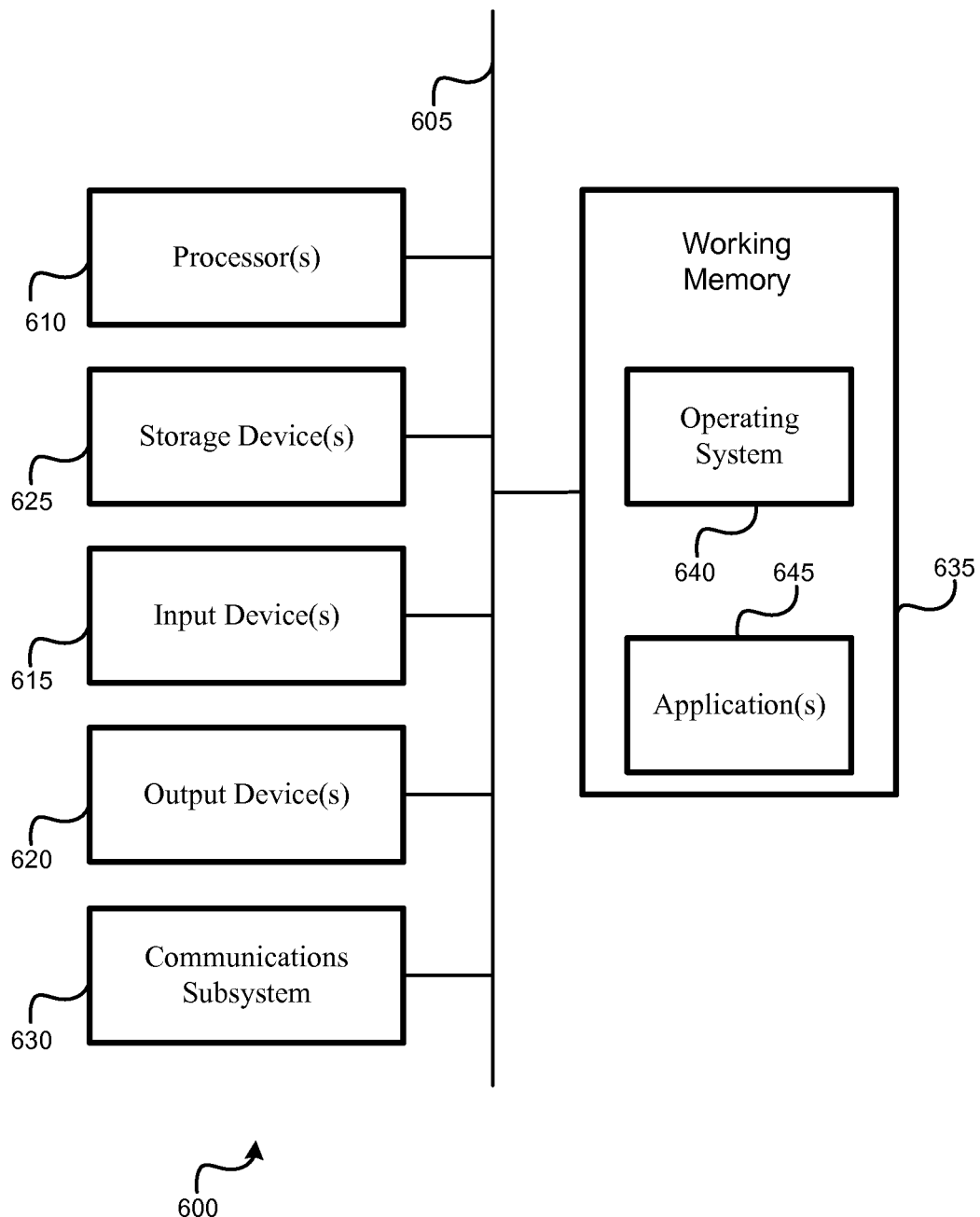
FIG. 6 illustrates an embodiment of a computer system.

FIG. 6 illustrates an embodiment of a computer system. A computer system as illustrated in FIG. 6 may be incorporated as part of the previously described devices. For example, computer system 600 can represent some of the components of the mobile devices discussed in this application. FIG. 6 provides a schematic illustration of one embodiment of a computer system 600 that can perform the methods provided by various other embodiments, as described herein. System 100 may be incorporated with a computer system, such as computer system 600. As such, a mobile device may include computer system 600 of FIG. 6 and system 100 of FIG. 1. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for selecting a function to be executed on a mobile device, the method comprising:
   receiving, by the mobile device based on end-user input, a first indication of a first function to program the mobile device to perform the first function when it is determined by the mobile device that the mobile device is held proximate to a left ear of a user;
   receiving, by the mobile device based on end-user input, a second indication of a second function to program the mobile device to perform the second function when it is determined by the mobile device that the mobile device is held proximate to a right ear of the user;
   receiving, by the mobile device based on end-user input, a third indication of a third function to program the mobile device to perform the third function when it is determined by the mobile device that the mobile device is held in front of a mouth of the user;
   collecting, by the mobile device, proximity data that indicates the mobile device is proximate to the user, wherein the mobile device is configured to collect proximity data from at least two proximity sensors including a first proximity sensor proximate to a speaker of the mobile device and second proximity sensor proximate to a microphone of the mobile device;
   collecting, by the mobile device, acceleration data;
   determining, by the mobile device, whether the mobile device is proximate to the left ear of the user, the right ear of the user, or being held in front of the mouth of the user using the acceleration data and the proximity data; and
   in response to determining whether the mobile device is proximate to the left ear, the right ear or being held in front of the mouth using the acceleration data and the proximity data, selecting, by the mobile device the function to be executed, wherein the function is selected from the first function, the second function, and the third function.

2. The method for selecting the function to be executed on the mobile device of claim 1, wherein determining whether the mobile device is proximate to the left ear of the user, the right ear of the user, or being held in front of the mouth of the user using the acceleration data and the proximity data comprises:
   determining a direction of acceleration along an axis of the mobile device, wherein the direction of acceleration along the axis varies based on whether the mobile device is proximate to the left ear of the user, the right ear of the user, or being held in front of the mouth of the user.

3. The method for selecting the function to be executed on the mobile device of claim 1, wherein a display of the mobile device is deactivated while each step of the method is being performed.

4. The method for selecting the function to be executed on the mobile device of claim 1, the proximity data indicates that a speaker of the mobile device is proximate to the user and the mobile device is being gripped.

5. The method for selecting the function to be executed on the mobile device of claim 1, further comprising:
   executing, by the mobile device, the function.

6. A mobile device configured to select a function to be executed, the mobile device comprising:
   at least two proximity sensors configured to collect proximity data, wherein the at least two proximity sensors are configured to collect proximity data proximate to a speaker of the mobile device and proximate to a microphone of the mobile device;
   an accelerometer configured to collect acceleration data;
   a processor; and
   a memory communicatively coupled with and readable by the processor and having stored therein processor-readable instructions which, when executed by the processor, cause the processor to:
      store, within the memory based on end-user input, a first indication of a first function to program the mobile device to perform the first function when it is determined by the mobile device that the mobile device is held proximate to a left ear of a user;
      store, within the memory based on end-user input, a second indication of a second function to program the mobile device to perform the second function when it is determined by the mobile device that the mobile device is held proximate to a right ear of the user;
      store, within the memory based on end-user input, a third indication of a third function to program the mobile device to perform the third function when it is determined by the mobile device that the mobile device is held in front of a mouth of the user;
      analyze the proximity data from the proximity sensor wherein the proximity data indicates the mobile device is proximate to the user;
      analyze acceleration data from the accelerometer;
      determine, using the acceleration data and the proximity data, whether the mobile device is proximate to the left ear of the user, the right ear of the user, or being held in front of the mouth of the user; and in response to determining whether the mobile device is proximate to the left ear, the right ear or being held in front of the mouth using the acceleration data and the proximity data, access the memory to select the function to be executed, wherein the function is selected from the first function, the second function, and the third function.

7. The mobile device configured to select a function to be executed of claim 6, wherein the processor-readable instructions which, when executed by the processor, cause the processor to determine, using the acceleration data and the proximity data, whether the mobile device is proximate to the left ear of the user, the right ear of the user, or being held in front of the mouth of the user further comprise processor-readable instructions, which, when executed cause the processor to:

determine a direction of acceleration along an axis of the mobile device, wherein the direction of acceleration along the axis varies based on whether the mobile device is proximate to the left ear of the user, the right ear of the user, or being held in front of the mouth of the user.

8. The mobile device configured to select a function to be executed of claim 6, the proximity data indicates that a speaker of the mobile device is proximate to the user and the mobile device is being gripped.

9. The mobile device configured to select a function to be executed of claim 6, wherein the processor-readable instructions further comprise processor-readable instructions, which, when executed by the processor, cause the processor to:

execute the function.

10. A non-transitory computer-readable medium for selecting a function to be executed on a mobile device, the non-transitory computer-readable medium comprising processor-readable instructions, which, when executed by the mobile device, cause the mobile device to:

detect receipt of, in response to end-user input, a first indication of a first function to program the mobile device to perform the first function when it is determined by the mobile device that the mobile device is held proximate to a left ear of a user;

detect receipt of, in response to end-user input, a second indication of a second function to program the mobile device to perform the second function when it is determined by the mobile device that the mobile device is held proximate to a right ear of the user;

detect receipt of, in response to end-user input, a third function to program the mobile device to perform the third function when it is determined by the mobile device that the mobile device is held in front of a mouth of the user;

collect proximity data that indicates the mobile device is proximate to the user, wherein the mobile device is configured to collect proximity data from at least two proximity sensors including a first proximity sensor proximate to a speaker of the mobile device and second proximity sensor proximate to a microphone of the mobile device;

collect acceleration data;

determine whether the mobile device is proximate to the left ear of the user, the right ear of the user, or being held in front of the mouth of the user using the acceleration data and the proximity data; and in response to determining whether the mobile device is proximate to the left ear, the right ear or being held in front of the mouth using the acceleration data and the proximity data, select the function to be executed, wherein the function is selected from the first function, the second function, and the third function.

11. The non-transitory computer-readable medium for selecting the function to be executed on the mobile device of claim 10, wherein the processor-readable instructions which, when executed by the mobile device, cause the mobile device to determine whether the mobile device is proximate to the left ear of the user, the right ear of the user, or being held in front of the mouth of the user using the acceleration data and the proximity data further comprise processor-readable instructions which, when executed by the mobile device, cause the mobile device to:

determine a direction of acceleration along an axis of the mobile device, wherein the direction of acceleration along the axis varies based on whether the mobile device is proximate to the left ear of the user, the right ear of the user, or being held in front of the mouth of the user.

12. The non-transitory computer-readable medium for selecting the function to be executed on the mobile device of claim 10, wherein a display of the mobile device is off while each of the processor-readable instructions is executed.

13. The non-transitory computer-readable medium for selecting the function to be executed on the mobile device of claim 10, wherein the proximity data indicates that a speaker of the mobile device is proximate to the user and the mobile device is being gripped.

14. The non-transitory computer-readable medium for selecting the function to be executed on the mobile device of claim 10, wherein the processor-readable instructions further comprise processor-readable instructions configured to cause the mobile device to:

execute the function.

15. An apparatus for selecting a function to be executed on a mobile device, the apparatus comprising:

means for receiving, based on end-user input:
a first indication of a first function to program the mobile device to perform the first function when it is determined by the mobile device that the mobile device is held proximate to a left ear of a user;
a second indication of a second function to program the mobile device to perform the second function when it is determined by the mobile device that the mobile device is held proximate to a right ear of the user; and
a third indication of a third function to program the mobile device to perform the third function when it is determined by the mobile device that the mobile device is held in front of a mouth of the user;

means for collecting proximity data that indicates the mobile device is proximate to the user, wherein the proximity data is collected from at least two proximity sensors, a first proximity sensor proximate to a speaker of the mobile device and second proximity sensor proximate to a microphone of the mobile device;

means for collecting acceleration data;

means for determining whether the mobile device is proximate to the left ear of the user, the right ear of the user, or being held in front of the mouth of the user using the acceleration data and the proximity data; and means for selecting the function to be executed at least partially in response to determining whether the mobile device is proximate to the left ear of the user, the right ear of the user, or being held in front of the mouth of the user using the acceleration data and the proximity data, wherein the function is selected from the first function, the second function, and the third function.

16. The apparatus for selecting the function to be executed on the mobile device of claim 15, wherein the means for determining whether the mobile device is proximate to the left ear of the user, the right ear of the user, or being held in front of the mouth of the user using the acceleration data comprises:
   means for determining a direction of acceleration along an axis of the mobile device, wherein the direction of acceleration along the axis varies based on whether the mobile device is proximate to the left ear of the user, the right ear of the user, or being held in front of the mouth of the user.

17. The apparatus for selecting the function to be executed on the mobile device of claim 15, wherein the means for display of the mobile device is deactivated while each step of the apparatus is being performed.

18. The apparatus for selecting the function to be executed on the mobile device of claim 15, the proximity data indicates that a speaker of the mobile device is proximate to the user and the mobile device is being gripped.

19. The apparatus for selecting the function to be executed on the mobile device of claim 15, further comprising:
   means for executing the function.

\* \* \* \* \*